United States Patent
Lavi et al.

(10) Patent No.: US 6,766,731 B1
(45) Date of Patent: Jul. 27, 2004

(54) SHREDDING APPLIANCE FOR SHREDDING VEGETABLES OR OTHER FOOD ARTICLES

(75) Inventors: Josef Lavi, Fort Lee, NJ (US); Eli Cohen, Moshav Tzur Moshe (IL)

(73) Assignee: AAC Trade Ltd., Fort Lee, NJ (US)

( * ) Notice: Subject to any disclaimer, the term of this patent is extended or adjusted under 35 U.S.C. 154(b) by 0 days.

(21) Appl. No.: 10/397,730

(22) Filed: Mar. 27, 2003

(51) Int. Cl.[7] .............................. A23L 1/00; A23N 1/00
(52) U.S. Cl. ............................. 99/492; 99/495; 99/510; 241/37.5; 241/92
(58) Field of Search ................... 99/495, 492, 509–513, 99/485; 241/92, 93, 169.1, 273.2, 273.3, 273.4, 37.5, 293, 294

(56) References Cited

U.S. PATENT DOCUMENTS

| | | | |
|---|---|---|---|
| 4,386,740 A | * | 6/1983 | Van Deursen ............... 241/93 |
| 4,856,718 A | * | 8/1989 | Gaber et al. .................. 241/93 |
| 4,884,755 A | * | 12/1989 | Hedrington ................ 241/37.5 |
| 5,680,997 A | * | 10/1997 | Hedrington .................. 241/93 |
| 5,970,860 A | * | 10/1999 | Yip ............................. 99/510 |

* cited by examiner

Primary Examiner—Timothy F. Simone
(74) Attorney, Agent, or Firm—G. E. Ehrlich (1995) Ltd.

(57) ABSTRACT

A shredding appliance for shredding vegetables or other food articles, includes a housing having an inlet for introducing the food articles to be shredded, and an outlet for outletting the shredded food articles; a rotatable shredding member of hollow construction; an electrical motor for rotating said hollow shredding member; and a transmission coupling said electrical motor to said hollow shredding member. The hollow shredding member has an outer surface aligned with said inlet and formed with shredding elements bordering openings for shredding the inletted food articles and for feeding the shredded food articles into the interior of the hollow shredding member. One end of the hollow shredding member is open and is aligned with the outlet for outletting the shreded food article.

12 Claims, 6 Drawing Sheets

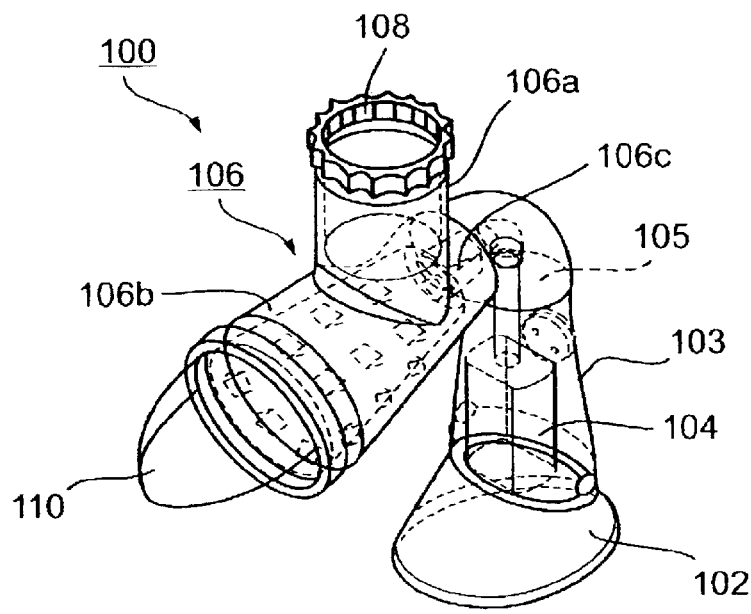
Fig. 9
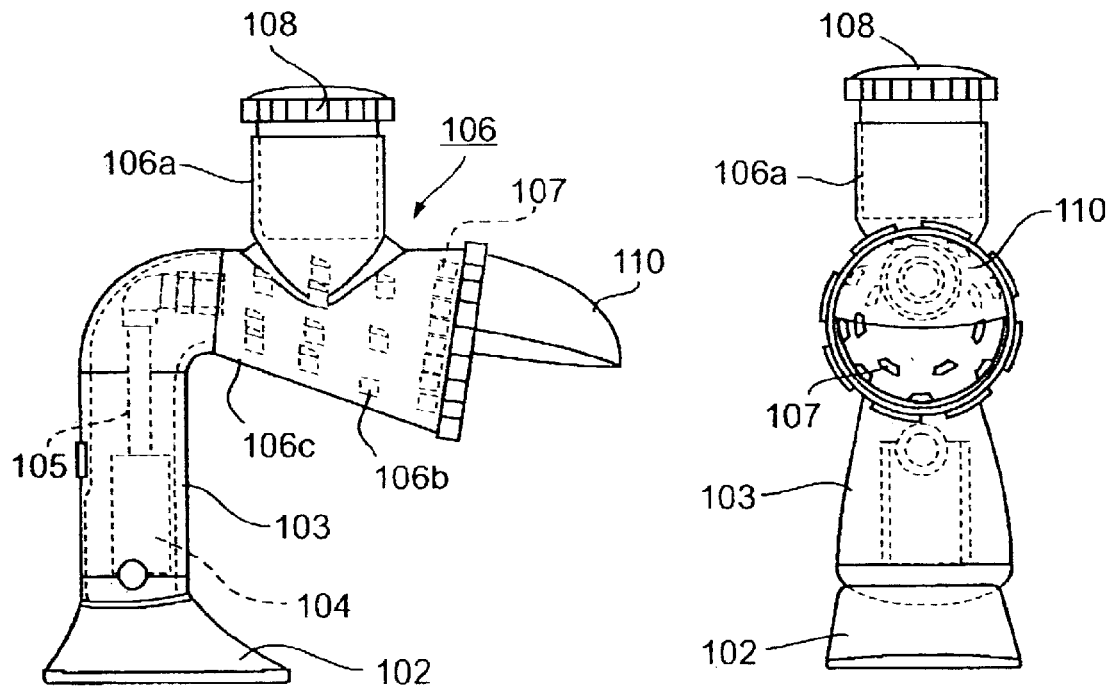
Fig. 10
Fig. 11

SHREDDING APPLIANCE FOR SHREDDING VEGETABLES OR OTHER FOOD ARTICLES

FIELD AND BACKGROUND OF INVENTION

The present invention relates to shredding appliances for shredding vegetables or other food articles.

Many types of multi-purpose food processor appliances include shredding members which are selectively usable for shredding vegetables and the like. Generally speaking, such shredding members are in the form of discs introducible into the appliance to adapt the appliance for shredding vegetables or other food articles. However, there are many known appliances, such as juicer or grinder appliances described in U.S. Pat. Nos. 5,761,993 and 6,397,736 which do not include a shredding operation. Including such an operation would substantially enhance the usefulness of such appliances. In addition, efforts are continuously being made to simplify the construction or improve the performance of shredding appliances, both when the shredding members are embodied in multi-purpose food-processing appliances, as well as in stand-alone shredding appliances.

OBJECTS AND BRIEF SUMMARY OF THE PRESENT INVENTION

An object of the present invention is to provide a shredding appliance having improvements in one or more the above respects.

According to one aspect of the present invention, there is provided a shredding appliance for shredding vegetables or other food articles, comprising: a shredding appliance for shredding vegetables or other food articles, comprising: a housing having an inlet for introducing the food articles to be shredded, and an outlet for outletting the shredded food articles; a rotatable shredding member of hollow construction; an electrical motor for rotating the hollow shredding member; and a transmission coupling said electrical motor to the hollow shredding member; the hollow shredding member having an outer surface aligned with the inlet and formed with shredding elements bordering openings for shredding the inletted food articles and for feeding the shredded food articles into the interior of the hollow shredding member; one end of the hollow shredding member being open and aligned with the outlet for outletting the shredded food article.

In the preferred embodiments of the invention described below, the shredding member is of conical configuration, being of large diameter at its open end aligned with the outlet. The opposite end of the conical shredding member, of smaller diameter, is coupled to the transmission to the electrical motor.

According to one preferred embodiment described below, the housing comprises a base including the electrical motor, a top cover including the inlet and defining, with the base, a compartment for receiving the hollow shredding member, and a locking bar pivotally mounted to the base and engageable with the top cover for locking the two together. Such an arrangement enables the shredding compartment to be conveniently opened, e.g. for cleaning the shredding member, for replacing it with another shredding member, etc.

In a second described preferred embodiment, the housing comprises an upper section including the inlet, the outlet, and the shredding member; a lower section including the electrical motor and transmission coupling the electrical motor to the shredding member; and a base for supporting the appliance on a flat horizontal surface. In the described preferred embodiment, the upper section is of a T-configuration having a vertically-extending portion including the inlet, a first horizontally-extending portion at one side and including the outlet and the shredding member, and a second horizontally-extending portion at the opposite side attachable to the lower section of the housing.

Further features and advantages of the invention will be apparent from the description below.

A BRIEF DESCRIPTION OF THE DRAWINGS

The invention is herein described, by way of example only, with reference to the accompanying drawings, wherein:

FIG. 9 is a perspective view illustrating another shredding appliance constructed in accordance with the present invention;

FIG. 10 is a side elevational view of the shredding appliance of FIG. 9;

FIG. 11 is a front elevational view of the shredding appliance of FIG. 9; and

It is to be understood that the above drawings, and the description below, are provided primarily for purposes of facilitating understanding the conceptual aspects of the invention and various possible embodiments thereof, including what is presently considered to be preferred embodiments. In the interests of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

The Shredding Appliance of FIGS. 1–8

The appliance illustrated in FIGS. 1–8 is basically the juicer or grinder appliance described in U.S. Pat. Nos. 5,761,993 and 6,397,736, but modified to adapt the appliance for use as a shredding appliance for shredding vegetables or other food articles, instead of, or in addition to, the juicer or grinder use described in those patents.

Figure 1:
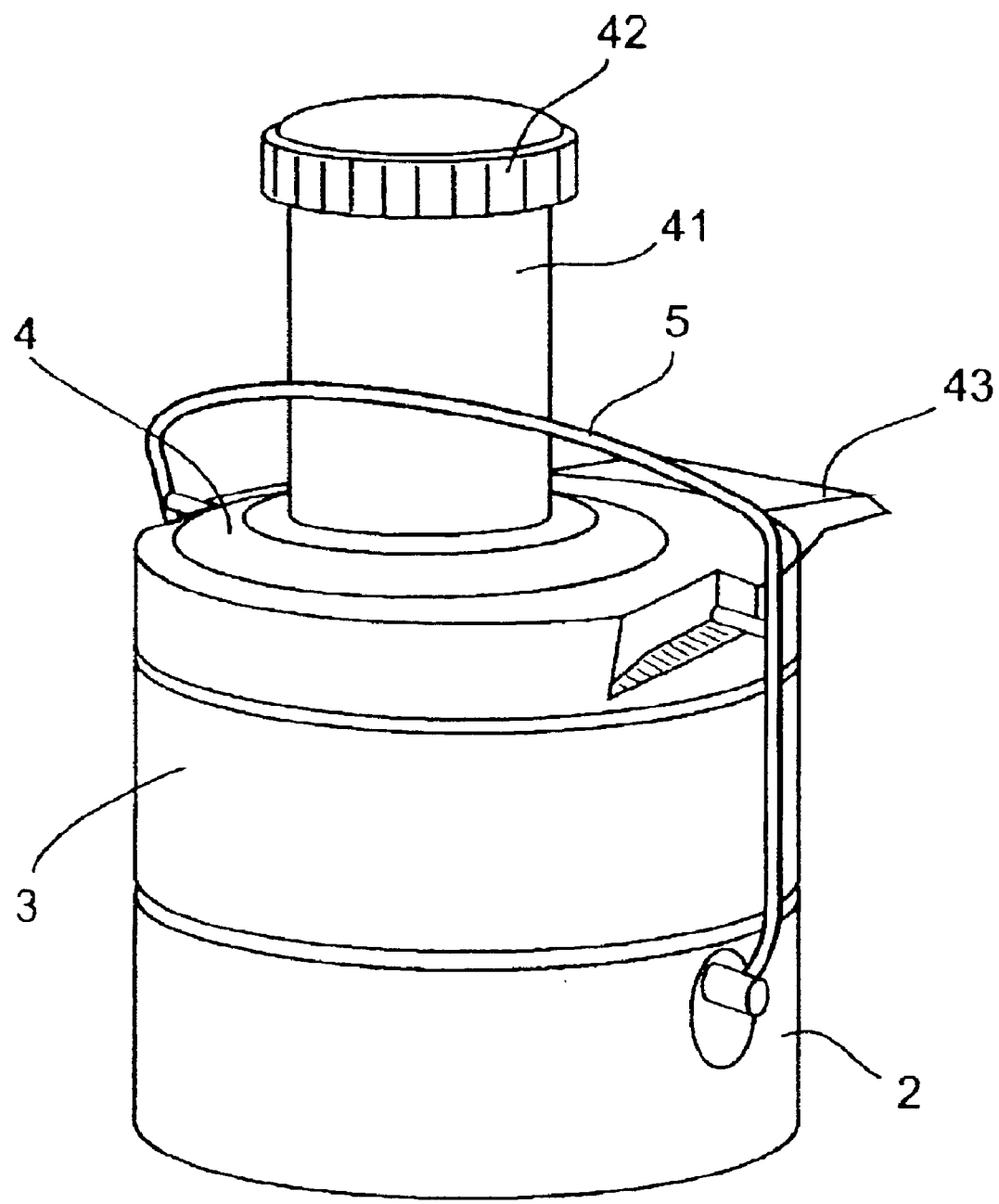
FIG. 1 is a pictorial view illustrating one form of shredding appliance constructed in accordance with the present invention.
Figure 2:
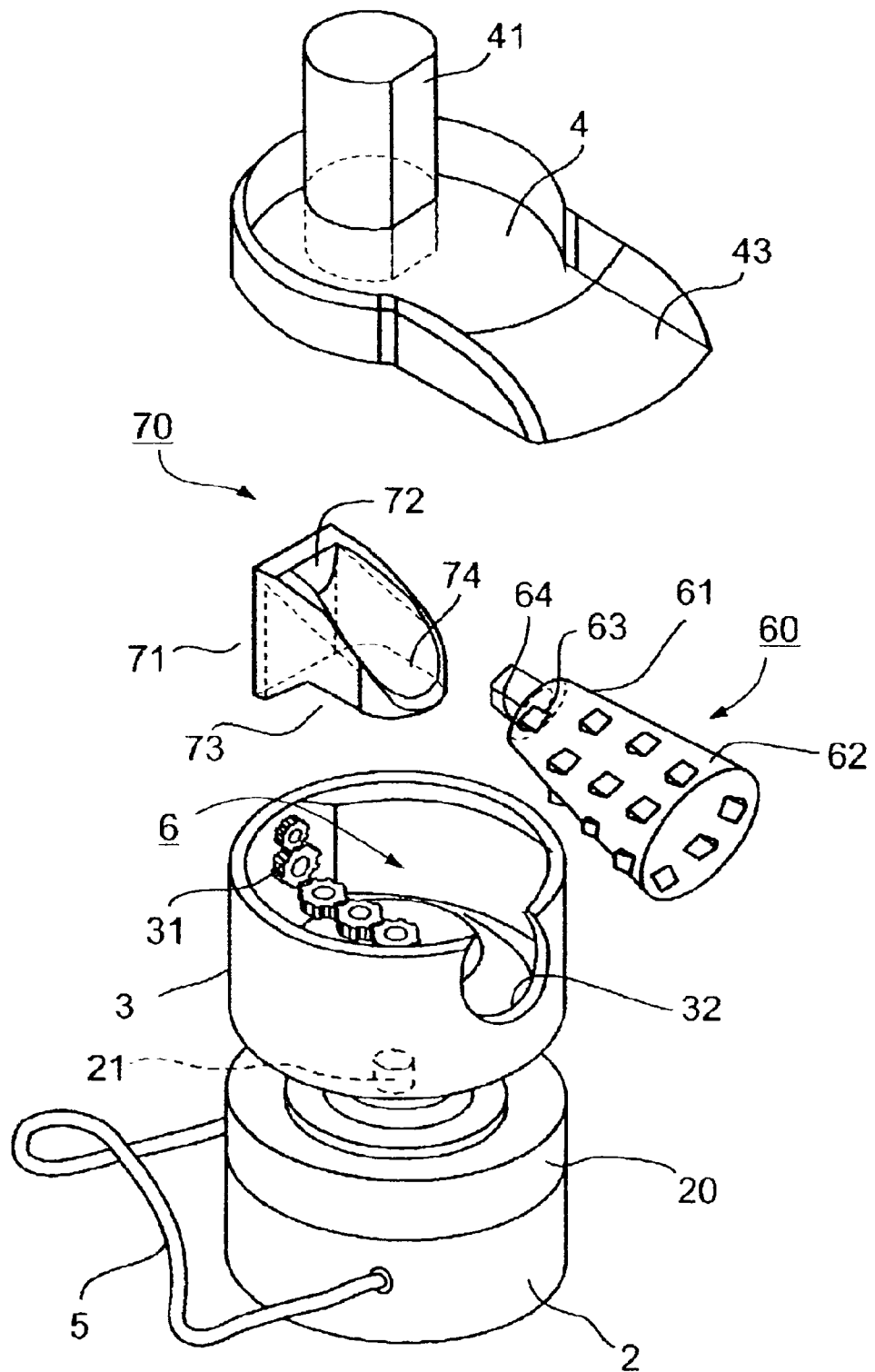
FIG. 2 is an exploded view of the main components of the shredding appliance of FIG. 1.
Figure 3:
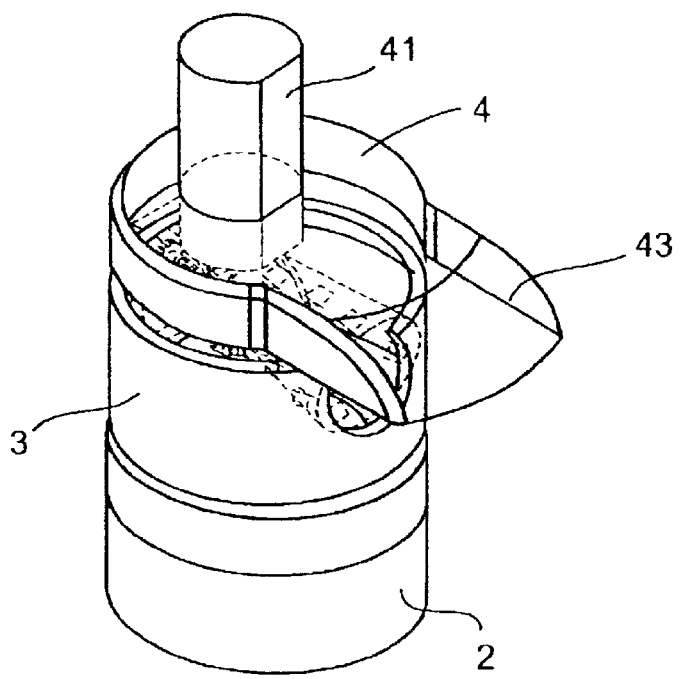
FIG. 3 is a diagrammatic perspective view illustrating the main components of the shredding appliance of FIGS. 1 and 2.
Figures 4, 5:
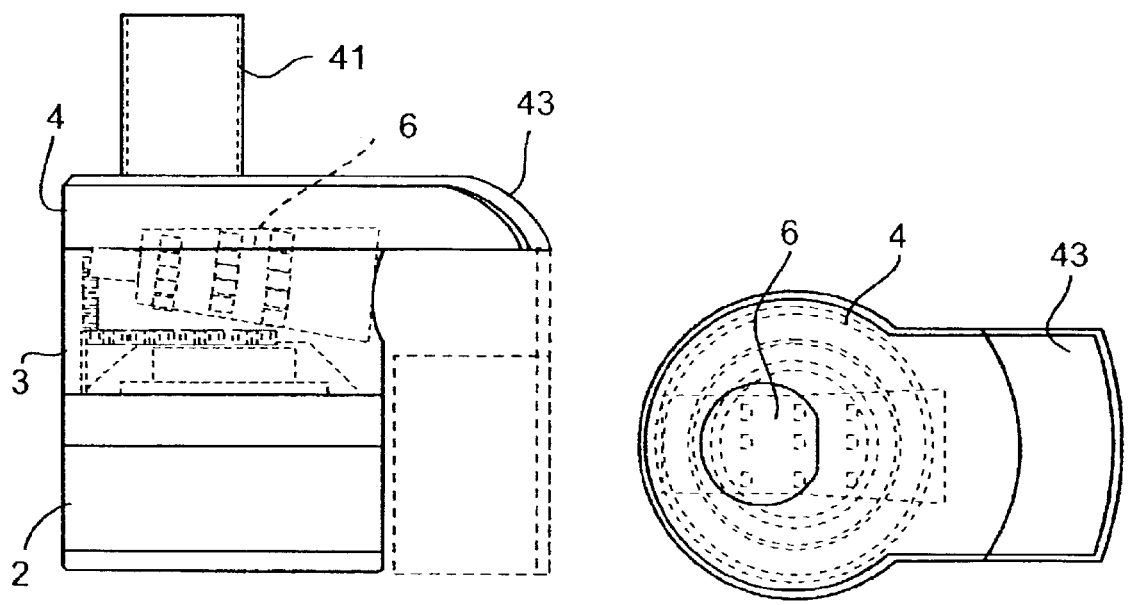
FIG. 4 is a side elevational view of FIG. 3.
FIG. 5 is a top plan view of FIG. 3.

As shown particularly in FIGS. 1–3, the illustrated appliance includes a housing constituted of a lower base 2, an upper base 3, and a top cover 4. The illustrated appliance further includes a locking bar 5 pivotally mounted to the lower base 2 and engageable with the cover 4 for selectively locking the cover in place, or unlocking it to enable access into the interior of the housing.

As further described in the above-cited patents, and as more particularly illustrated in FIG. 2, the lower base 2 houses an electrical motor (shown in phantom at 20), having an output rotary shaft 21, while the upper base 3 houses a gear transmission 31 for coupling the motor of the shaft 21 to the food-processing member within the processing compartment 6. The latter compartment is defined by the upper base 3 and cover 4 when locked together by the locking bar 5.

As further shown in FIG. 2, cover 4 includes the food inlet, in the form of a feed tube 41, for inletting the food to be processed into the processing compartment 6. The inlet feed tube 41 is closed by a pusher member 42 for manually pushing the food to be processed into the processing compartment 6.

In the above-cited patents, the processing member within processing compartment 6, and driven by the electrical motor 20 in the lower base 2, is a disc formed with cutting blades for cutting the food articles introduced into the processing compartment 6 into very small pieces in order to enable the juice in the food articles to be extracted. For this purpose, the processing compartment 6 further includes a strainer basket (not shown) for straining the juice from the pulp, which juice is removed from an outlet (not shown) in the upper base 3. Also, the cover 4 includes a lateral extension 43 for receiving or locating a receptacle (not shown) to collect the pulp remaining after extraction of the juice.

Further details of the construction and operation of such an appliance are set forth in the above-cited patents, the contents of which are incorporated herein by reference.

According to the present invention, the processing compartment 6 is provided with a shredding member, generally designated 60, of hollow construction, and a backing member 70. underlying the shredding member 60, to aid it in shredding the food articles and also to cover gear transmission 31 within the upper base 3.

As shown particularly in FIG. 2, hollow shredding member 60 is of a conical configuration. It has a small diameter end 61 coupled to the gear transmission 31 so as to be rotated by the motor within the lower base 2, and a large-diameter end 62 aligned with an opening 32 (FIG. 2) in the upper base 3 serving as an outlet for the shredded food articles.

As further shown particularly in FIG. 2, the hollow shredding member 60 is received within the processing compartment 6 such that the outer surface of the shredding member is in alignment with the food inlet 41. The outer surface of the shredding member is formed with a plurality of shredding elements 63 bordering openings 64 communicating with the interior of the shredding member. The arrangement is such that the rotation of the hollow shredding member 60 shreds the inletted food articles and feeds them into the interior of the shredding member, and out through its large-diameter end 62.

Backing member 70 includes a mounting section 71 for mounting it, in any suitable manner within the interior of the upper base 32 in alignment with the food inlet 41 of the cover 4. The mounting section 71 is formed with an opening 72 for accommodating the outlet end of the gear transmission 31 within the upper base 3.

Backing member 70 further includes an inwardly-extending section 73 formed with a curved surface 74 aligned with, but spaced below, the outer surface of the conical shredding member 60. Curved surface 74 thus better assures efficient shredding of the food articles introduced via the inlet 41 during the rotation of the shredding member by the electrical motor within the lower base 2. Sections 71, 73 of backing member 70 also serve to cover the gear transmission 31 from the electrical motor to the shredding member.

The manner of using the illustrated appliance will be apparent from the above description. Thus, assuming that the appliance is equipped with the hollow shredding member 60 and backing member 70 within the food-processing compartment 6, the vegetables or other food articles to be shredded may be introduced into the appliance via the feed tube inlet 41, e.g. by the aid of pushing member 42. The food articles so introduced into compartment 6 are engaged by the shredding elements 63 which shred the food articles and feed them through the opening 64 into the interior of the hollow shredding member and out through its large-diameter end 60b.

As indicated above, backing member 70 better assures, by its spaced underlying curved surface 74, efficient shredding of the food articles. It also serves partly to cover the gear transmission 31 from the electrical motor within the lower base 2 to the hollow shredding member 60.

Cleaning the appliance can be conveniently done by merely pivoting locking bar 50 to its lower unlocking position, thereby releasing cover 4 for removal to provide access into the interior of the shredding compartment 6.

Figure 6:
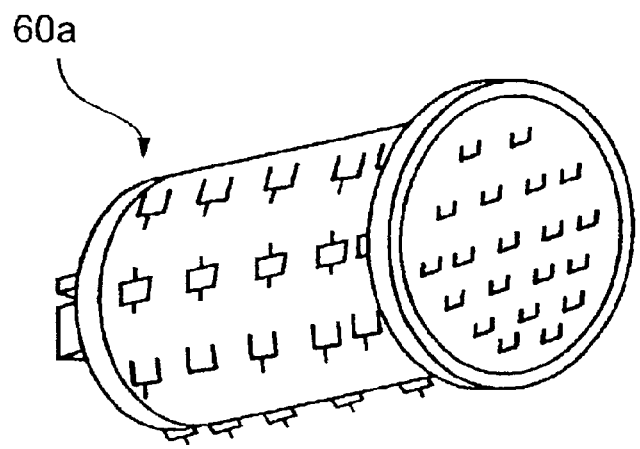
FIGS. 6–8 illustrate other types of shredding members which may be selectively included in the shredding appliance of FIGS. 1–5.
Figure 7:
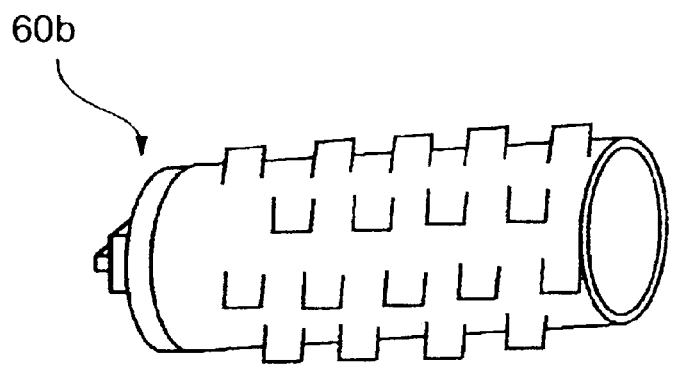
Figure 8:
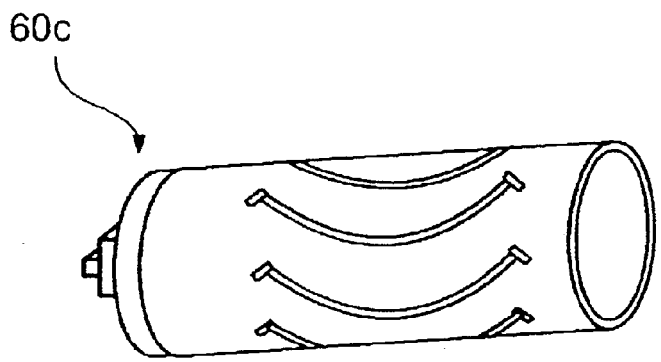
Figure 12:
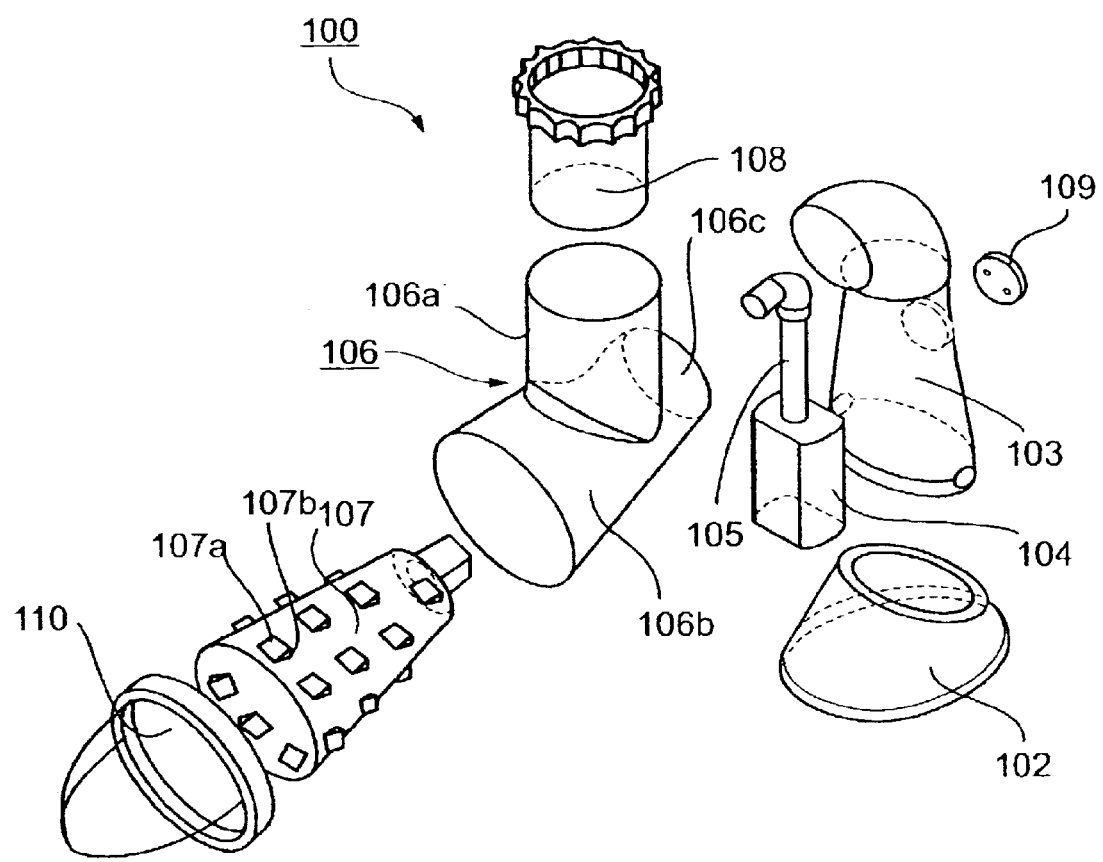
FIG. 12 is an exploded perspective view illustrating the main components of the shredding appliance of FIGS. 9–11.

Preferably, the appliance is provided with a plurality of shredding members, such as shown in FIGS. 6–8, which may be selectively introduced into the shredding compartment 6 according to the particular food articles to be shredded, or the type of shredding (e.g. fine, coarse, etc.) desired to be produced. While FIGS. 6–8 illustrate the hollow shredding members, therein designated 60a, 60b and 60c, respectively, as being of cylindrical configuration, it will be appreciated that they could also be, and preferably are, of the conical configuration of shredding member 60 described above.

The Appliance of FIGS. 9–12

FIGS. 9–12 illustrate a simpler single-purpose appliance constructed in accordance with the present invention, for use only for shredding vegetables or other food articles. The appliance illustrated in FIGS. 9–12, therein generally designated 100, includes a base 102 for supporting the appliance on a flat horizontal surface; a vertically-extending lower housing section 103 housing the electrical motor and transmission, schematically indicated at 104 and 105, respectively, in FIG. 12; and an upper housing section 106 for housing the shredding member 107. As shown particularly in FIG. 12, housing section 106 is of a T-configuration, being constituted of a vertically-extending cylindrical tube 106a joined at an intermediate portion to a horizontally-extending conical tube such as to define two horizontally-extending conical portions 106b and 106c on opposite sides of the vertically-extending cylindrical tube 106a. A conical shredding member 107, including shredding elements 107a bordering openings 107b is received within this horizontally-extending tube defining housing sections 106b and 106c.

The vertically-extending tube 106a serves as the inlet feed tube for introducing the food articles to be shredded into the appliance. It is adapted to receive a manual push member 108 for manually pushing the food articles through the feed tube. The horizontally-extending conical tube defining housing portions 106b, 106c receiving member 107 is of a conical configuration, corresponding to that of shredding member 107 but of larger diameter such that its inner surface is spaced from its shredding elements 107a. Horizontally-extending portion 106c on the opposite side of the inlet feed tube 106a is adapted to receive the terminal element 105a of the transmission 105 for coupling the small-diameter end of the conical shredding member 107 to the electrical motor 104.

Electrical motor 104 within base 102 is controlled by an electrical switch 109 (FIG. 12) mounted in the vertically-extending housing section 103.

It will thus be seen that when the electrical motor is operated and food is introduced via the inlet feed tube 106a, the shredding elements 107a on the outer surface of shredding member 107, will shred the inletted food articles and will feed them, via the openings 107b into the interior of shredding member 107 and through its large-diameter end, as described above.

When the appliance is not operated, the outlet end of the shredding member 106 may be closed by a cover 110. A similar cover could of course be provided with respect to the appliance illustrated in FIGS. 1–8.

It will be appreciated that the appliance of FIGS. 9–12 could also include a plurality of interchangeable shredding members of different configurations, and/or of different types of shredding elements, as described above with respect to the appliance of FIGS. 1–8, selectively usable by the user according to the type of food article being shredded and/or the type of shredding desired.

While the invention has been described with respect to two preferred embodiments, it will be appreciated that these are set forth merely for purposes of example, and that many other variations, modifications and applications of the invention may be made.

What is claimed is:

1. A shredding appliance for shredding vegetables or other food articles, comprising:
   a housing having an inlet for introducing the food articles to be shredded, and an outlet for outletting the shredded food articles;
   a rotatable shredding member of hollow construction;
   an electrical motor for rotating said hollow shredding member;
   and a transmission coupling said electrical motor to said hollow shredding member;
   said hollow shredding member having an outer surface aligned with said inlet and formed with shredding elements bordering openings for shredding the inletted food articles and for feeding the shredded food articles into the interior of the hollow shredding member;
   one end of said hollow shredding member being open and aligned with said outlet for outletting the shredded food article;
   said housing comprising a base including said electrical motor, said transmission, and said outlet; a top cover including said inlet and defining, with said base, a compartment for receiving said hollow shredding member; and a locking bar pivotally mounted to said base and engageable with said top cover for locking said top cover to said base.

2. The shredding appliance according to claim 1, wherein said shredding member is of conical configuration, being of large diameter at its said open end aligned with the outlet.

3. The shredding appliance according to claim 2, wherein the opposite end of said conical shredding member is of smaller diameter and is coupled to said transmission.

4. The shredding appliance according to claim 1, wherein said inlet includes a feed tube adapted to receive a pusher member for pushing the food articles through the inlet feed tube.

5. The shredding appliance according to claim 1, wherein said compartment also includes a backing member having a curved surface spaced below said hollow shredding member for facilitating the shredding of the food articles thereby.

6. The shredding appliance according to claim 1, wherein said top cover further includes a lateral extension aligned with said outlet and adapted to overlie a receptacle to receive the shredded food articles from said outlet.

7. The shredding appliance according to claim 1, wherein the appliance includes a plurality of said hollow shredding members selectively introducible into said housing.

8. A shredding appliance for shredding vegetables or other food articles, comprising:
   a housing having an inlet for introducing the food articles to be shredded, and an outlet for outletting the shredded food articles;
   a shredding member of hollow construction rotatable about an axis aligned with said outlet;
   an electrical motor for rotating said hollow shredding member;
   and a gear transmission coupling said electrical motor to said hollow shredding member;
   said housing comprising a base including said electrical motor; a top cover including said inlet and defining, with said base, a compartment for receiving said hollow shredding member, and a locking bar pivotally mounted to said base and engageable with said top cover for locking the top cover to the base;
   said hollow shredding member having an outer surface aligned with said inlet and formed with shredding elements bordering openings for shredding the inletted food articles and for feeding the shredded food articles into the interior of the hollow shredding member; one end of said hollow shredding member being open and aligned with said food outlet for outletting the shredded food article.

9. The shredding appliance according to claim 8, wherein said shredding member is of conical configuration, having an open end of large diameter aligned with said outlet, and an opposite end of smaller diameter aligned with said transmission.

10. The shredding appliance according to claim 8, wherein there are a plurality of said shredding members selectively introducible into said compartment.

11. The shredding appliance according to claim 8, wherein said compartment also includes a backing member having a curved surface spaced below said hollow shredding member.

12. The shredding appliance according to claim 8, wherein said top cover of the housing further includes a lateral extension aligned with said outlet and adapted to overlie a receptacle to receive the shredded food articles from said outlet.

* * * * *